Nov. 6, 1956   F. A. LANDGRABER, SR   2,769,423
CONFECTION COATING APPARATUS
Original Filed Nov. 6, 1951   7 Sheets-Sheet 1

INVENTOR
*Fred A. Landgraber, Sr.*

BY *Mason, Fenwick & Lawrence*
ATTORNEYS

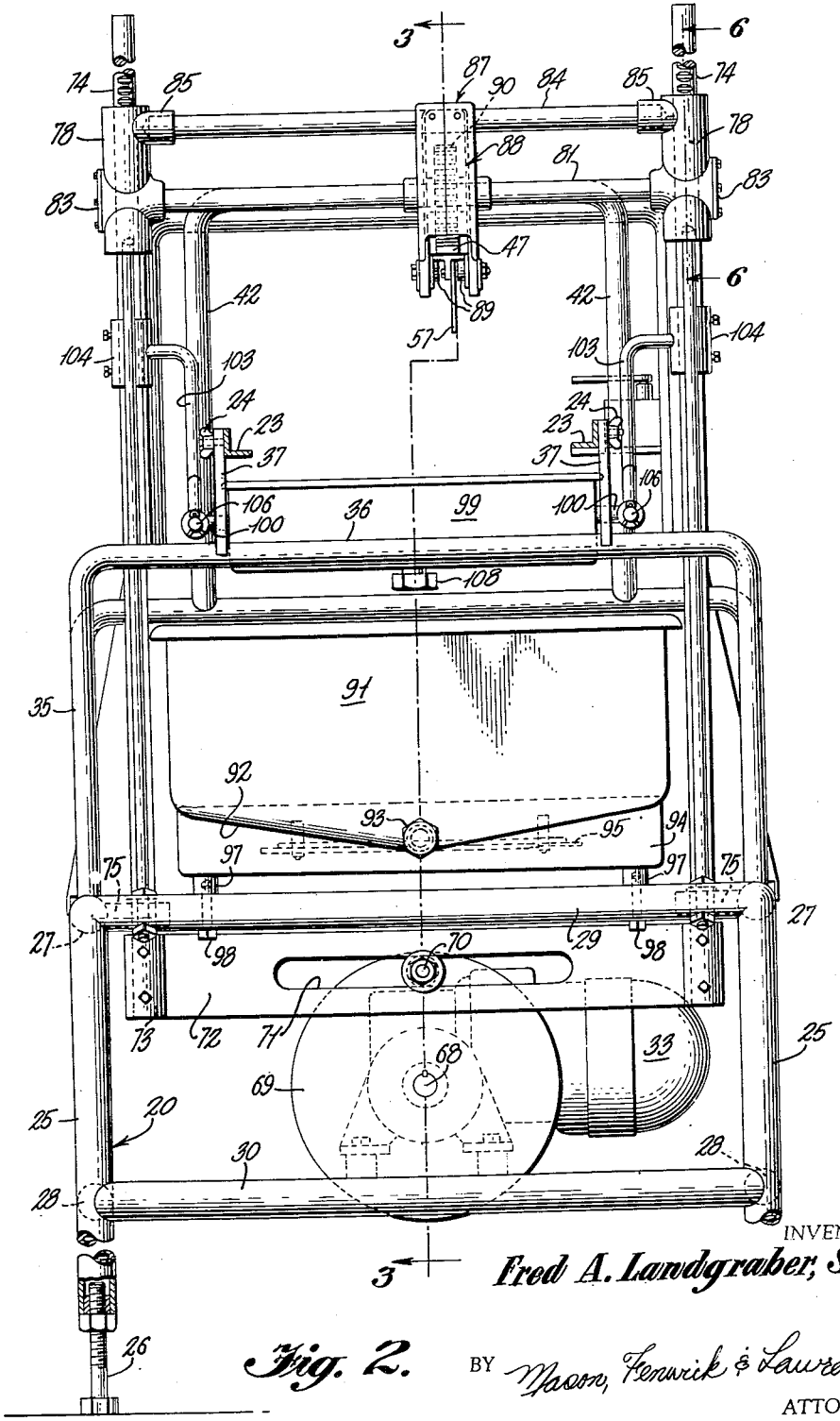

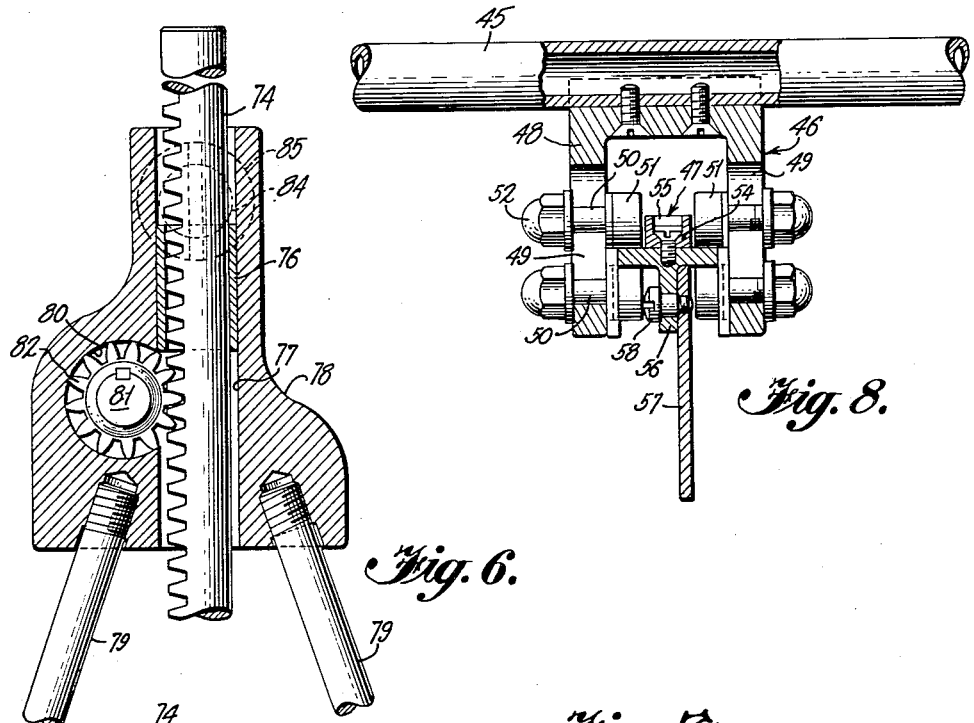

Nov. 6, 1956　　F. A. LANDGRABER, SR　　2,769,423
CONFECTION COATING APPARATUS
Original Filed Nov. 6, 1951　　7 Sheets-Sheet 4

INVENTOR
Fred A. Landgraber, Sr.

BY Mason, Fenwick & Lawrence
ATTORNEYS

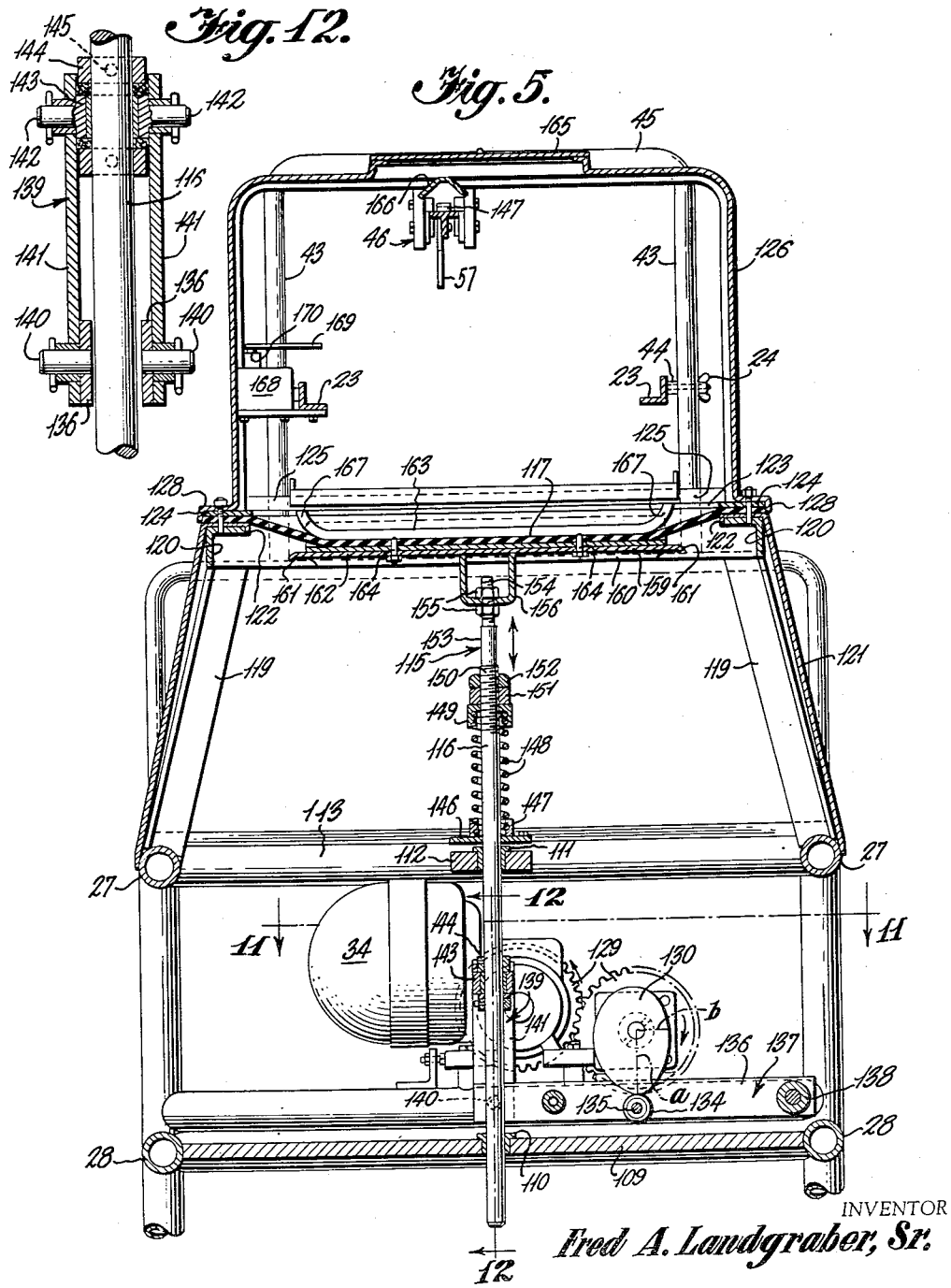

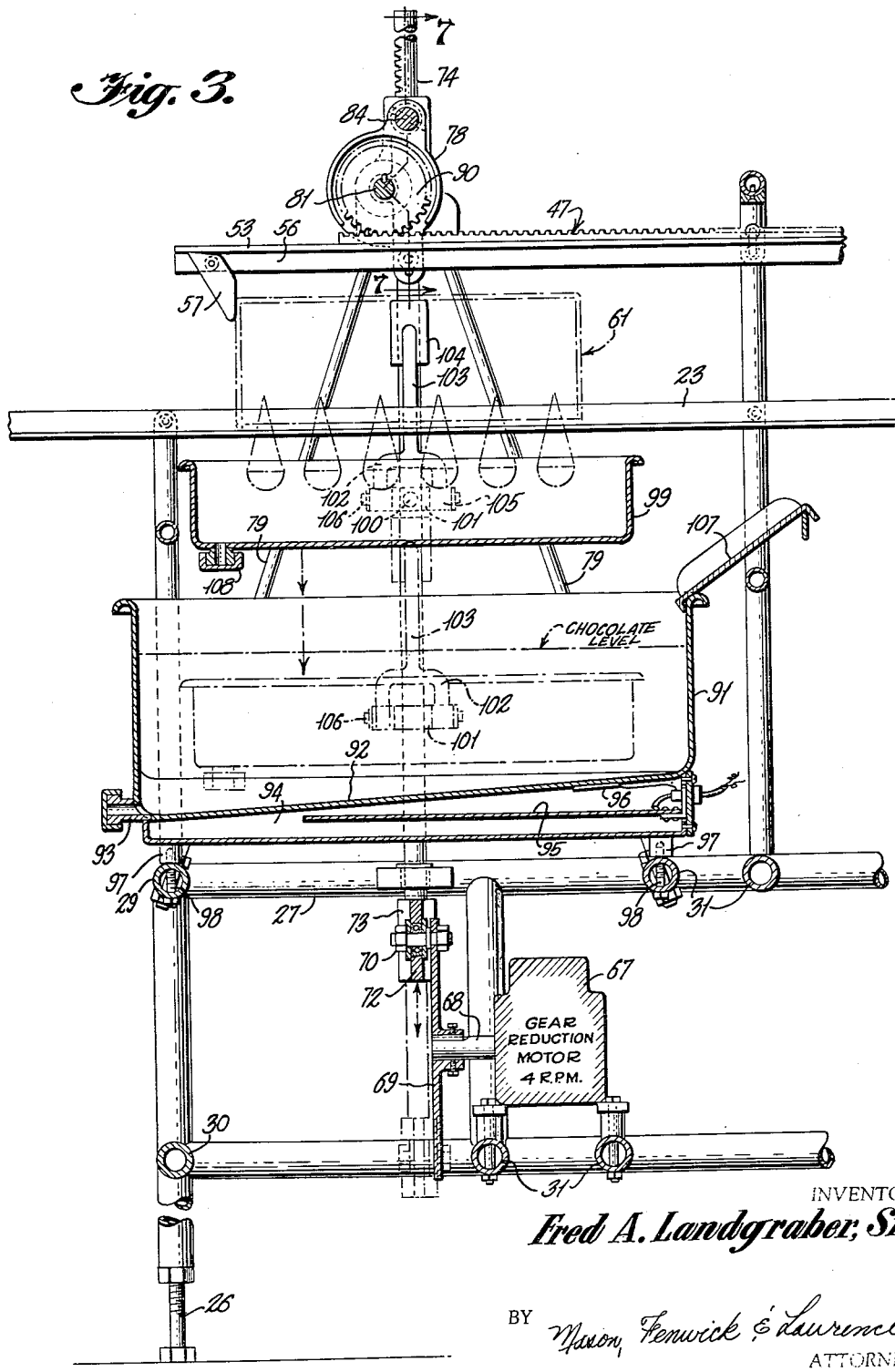

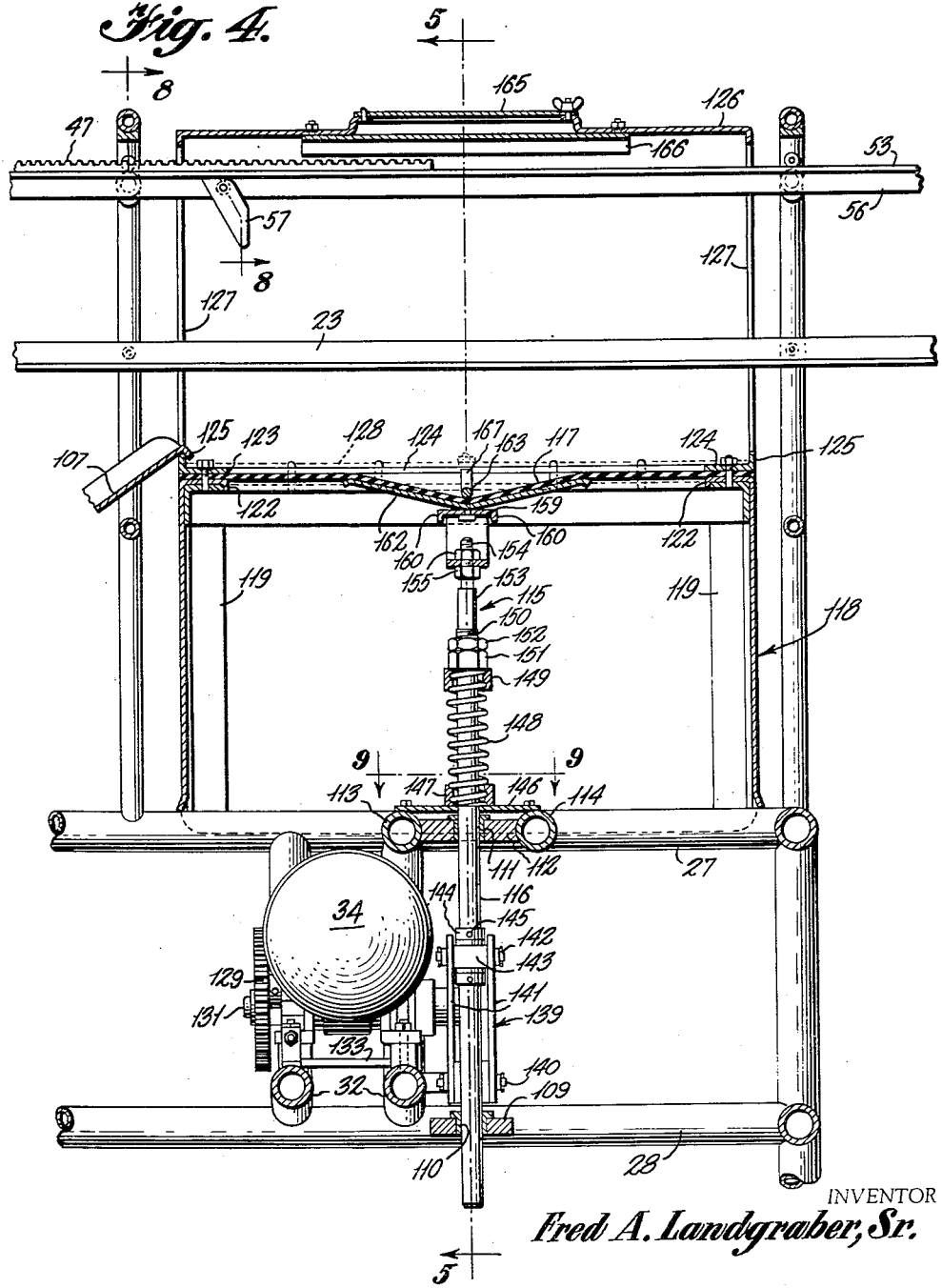

United States Patent Office 2,769,423
Patented Nov. 6, 1956

2,769,423

CONFECTION COATING APPARATUS

Fred A. Landgraber, Sr., Port Newark, N. J., assignor to Drumstick, Inc., Fort Worth, Tex., a corporation of Texas Original application November 6, 1951, Serial No. 255,115, now Patent No. 2,670,887, dated March 2, 1954. Divided and this application December 23, 1953, Serial No. 399,898

10 Claims. (Cl. 118—2)

This invention relates to apparatus for making a finished ice cream confection, starting with a filled hard frozen ice cream cone in which the ice cream extends beyond the rim of the cone, usually in a convex mound of uniformly smooth contour. The finished confection comprises this cone with the projecting part of the filler enrobed with chocolate or other edible coating, which is preferably studded with comminuted nut meats or other edible granules. The term "ice cream" is used as an example of a number of equivalent frozen fillers.

This application is a division of my copending application S. N. 255,115, filed November 6, 1951, now Patent No. 2,670,887.

One of the objects of the invention is to provide apparatus for making a frozen confection such as is above described, which is untouched by human hands throughout the extent of its manufacture.

Another object of the invention is to provide apparatus in which all parts with which the product or its ingredients come into contact are readily disassemblable so that they can be removed for thorough cleansing.

Still another object of the invention is the provision of apparatus including means for conveying baskets of filled cones successively, first to an enrobing station, then to a nut-applying station at which nut fragments are thrown from a vibratory plate against the enrobed surface of the cones, the vibrating means being responsive to the presence of a basket at the enrobing station, being inactive when there is no basket present at said enrobing station, whereby the action of the vibratory plate is discontinuous, minimizing the tendency of the nuts to "oil off," which they do excessively under continuous impact, resulting in oily surfaces of the nut fragments with resultant adhesiveness of the nuts to the enrobed surface of the cones.

Other objects of the invention will appear as the following description of a preferred and practical embodiment thereof proceeds.

In the drawings which accompany and form a part of the following specification, and throughout the several figures of which the same reference characters denote identical parts:

Figure 2 is an end elevation viewed from the left in Figure 1;

Figure 3 is a vertical section taken along the line 3—3 of Figure 2;

Figure 4 is a longitudinal vertical section through the vibratory nut meat applicator;

Figure 5 is a vertical section taken along the line 5—5 of Figure 4;

Figure 6 is a vertical section taken along the line 6—6 of Figure 2;

Figure 7 is a vertical section taken along the line 7—7 of Figure 3;

Figure 8 is a section taken along the line 8—8 of Figure 4;

Figure 12 is a section taken along the line 12—12 of Figure 5.

Before proceeding to a detailed description of the apparatus it may facilitate the understanding of the description to state at this point that the filled cones come to the apparatus in a known type of basket in which the cones are held head down; that the baskets slide on tracks which extend through the machine; that the movement of the baskets is step by step, first to an enrobing station at which the chocolate coating is applied, and then to the nut applying station; that the step by step movement of the baskets to the enrobing station and nut applying station is effected by an overlying rack bar having depending unidirectionally swinging pawls at proper intervals, which ride over a basket in the outward movement of the rack bar and engage the far side of the basket, drawing it inward upon the opposite stroke of the rack bar, the amplitude of reciprocation of this rack bar being such that it stops the baskets in precise positions at the enrobing and nut applying stations.

With this general outline of the arrangement of the apparatus, the detailed description is as follows:

The apparatus, which as a whole is designated by the numeral 20, comprises a portable frame 21, through which extends a rigid track 23 which can be removed from the frame 21 through the instrumentality of the wing nuts 24 to permit the track to be taken out for cleaning.

Figure 1:
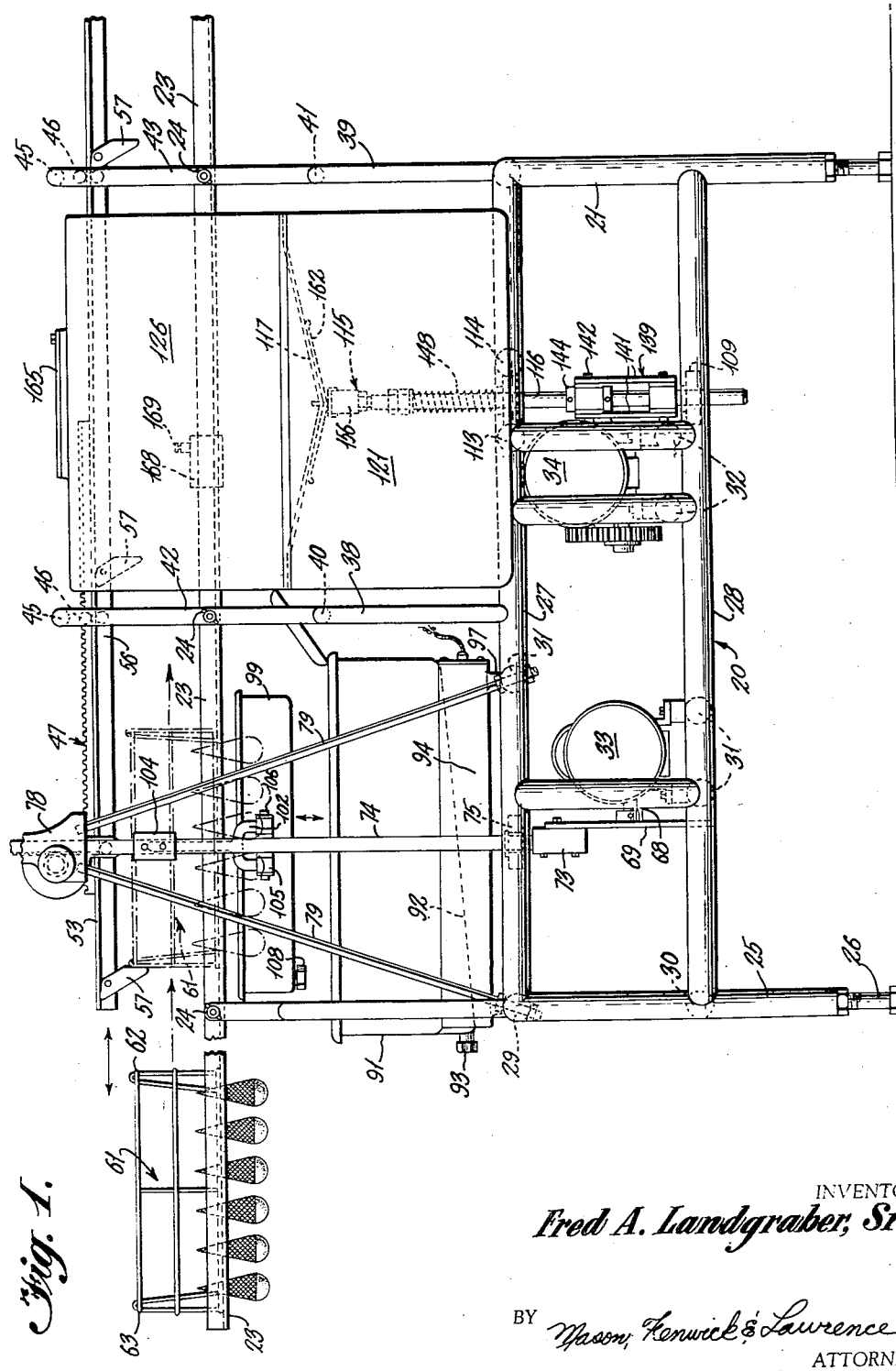
Figure 1 is a side elevation of apparatus embodying the principles of the invention.

The frame section 21 can be comprehended from Figure 1 and Figure 2. It consists of corner posts 25, having levelers 26 at the foot, upper and lower longitudinals 27 and 28, and upper and lower end cross pieces 29 and 30. The lower longitudinals are bridged by two pairs of spaced intermediate cross pieces 31 and 32, the pieces 31 supporting the motor 33 that operates the enrobing mechanism and the rack bar which brings the baskets to the enrobing and nut applying stations. The pair of cross pieces 32 support the motor 34, which operates the nut meat applying mechanism. At the outer end of the frame arises the inverted U-shaped member 35, having the cross rail 36 that carries the spaced uprights 37 with holes at their upper ends, receiving the threaded studs which project from the angular tracks 23, secured to said uprights by wing nuts 24 screwing upon said studs (see Figure 2).

At the middle of the upper longitudinals 27 and at the inner end of the frame section 21 rise the similar inverted U-shaped members 38, 39, and supported from the cross rails 40 and 41 of these members are the inverted U-shaped extensions 42 and 43, the sides of which are spaced narrowly enough to support the parallel tracks 23 with the aid of tubular spacers 44, (see Figure 5), through which spacers the threaded studs on the back of the track extend. Other wing nuts 24 screw on these studs and secure the track to the sides of these extensions. All of the frame members are preferably made of tubular stock and preferably of stainless steel or other bright and polished metal which can be kept in immaculate sanitary condition.

The top rails 45 of the extensions 42 and 43 are at the same height and carry the hangers 46 which support and guide the reciprocating rack bar 47. Figure 8 shows a fragment of one of the top rails 45 and a section through one of the hangers. This member comprises an inverted channel shaped fitting 48 secured to the underside of the top rail, and having vertical adjusting slots 49 in its opposite sides. Bolts 50 extend through these slots, having rollers 51 at their inner ends and nuts 52 at their outer ends for securing the bolts in adjusted positions. The upper and lower pair of rollers are spaced. The rack bar 47 in the form shown is composite, comprising a lower part 53 of T-shape cross-section, with the top of the T resting upon the rollers of the lower pair and guided in the space between the upper and lower rollers. The stem of the T depends, forming the stiffening fin 56 of the rack bar. The upper part of the rack bar is a strip 54, having the rack teeth 55 and secured to the lower part 53, as by the screws shown. Pawls 57 are dependingly mounted on the fin 56 by the pivot pins 58. Figure 1 shows that the pawls 57 can swing freely to the right, but cannot swing leftward beyond the positions shown in Figure 1, since they are stopped by contact of their upper left corners with the underside of the top of the T-shaped portion 53 of the rack bar.

The basket 61, illustrated in Figure 1 has top wires 62 and 63 at the front and rear ends of the basket which are of equal height. There are no transverse wires of the same height between the front and the rear of the basket, and the cones are arranged in successive transverse parallel rows, six cones to a row.

The rack bar 47 is operated from a gear reduction box 67 driven by the motor 33, which is supported by the cross pieces 31, and operates through gear reduction to rotate the output shaft 68 at 4 R. P. M. A crank wheel 69 is carried by the shaft 68, and has a crank pin 70 that operates through suitable antifriction bearings in the slot 71 of a cross-head 72, moving the latter up and down. The cross head 72 is a flat transverse member, the ends of which are enlarged to form sockets 73. Vertical parallel toothed racks 74 are secured in said sockets at their lower ends and reciprocate with the cross heads. They are guided near the lower ends by the tubular bracket 75 through which they slide, and which extend inwardly from the upper longitudinals 27 of frame section 21, and near their upper ends they are guided by bushings 76 in vertical bores 77, formed in the heads 78, shown in detail in Figure 6.

The heads 78 are each carried by a pair of upwardly convergent rods 79, the upper ends of which are screwed into said heads and the divergent lower ends of which are secured to one of the upper end cross pieces 29 of the frame and the intermediate cross piece 31 which lies next to it. The heads and supporting rods are spaced transversely substantially the width of the frame. The heads are identical. Each has a gear recess 80, with an axial bearing bore for a shaft 81, the bores of both heads being in horizontal alignment, there being a shaft extending through said bores having a gear 82 in each recess, said gears being in mesh with the respective racks 74, by means of which the two racks move simultaneously, and in so moving they impart rotation to the shaft 81.

The heads 78 are provided with cover plates 83 for the recesses 80, giving access for lubrication, etc. Above the shaft 81 is a brace bar 84, the ends of which fit into aligned sockets 85 on confronting faces of the heads, said sockets and bar having registering bores 86 for taper pins which secure the bar and heads rigidly together, stiffening the upright structures constituted by said heads and the supporting rods 79.

Figure 7 shows that the bar 84 at its middle supports a divided casing 87, through which the shaft 81 passes, the sides 88 of the casing having bearings in which the shaft is journaled. The lower part of the casing is formed as a hanger for the rack bar 47, which rests upon the adjustable rollers 89. Within the casing 87, and keyed to the shaft 81 is the gear 90 that meshes with the rack bar 47. The gears 82 which mesh with the racks 74 are small, while the gear 90 is large, so that the movement of the racks 74 is magnified in the movement of the rack bar 47, the amplitude of reciprocation of which is as we have seen, the length of the basket.

The racks 74 are also the means for operating the enrober. The latter comprise a deep rectangular pan 91 arranged symmetrically with respect to a vertical plane through the racks 74. Said pan is for a working supply of molten chocolate or other enrobing mixture. The bottom 92 of said pan slopes downwardly from both sides, and also from back to front, as seen in Figures 2, 3 and 1, so as to drain to a single point at which there is a discharge spout 93 having a suitable closure. Beneath the pan, but forming part of the pan unit, is the heating chamber 94, which contains an electric heater 95 in proximity to the bottom of the pan, controlled by a thermostat 96, which is against the bottom of the pan and within the heating chamber, (see Figure 3). The pan unit is removable, since it has external feet 97 on the bottom wall of the heating chamber, which rest upon adjacent upper cross pieces 29 and 31 of the frame, and are fastened thereto by the bolts 98.

A shallow and somewhat smaller constant level pan 99 dips into the larger pan to a depth below the level of chocolate in the larger pan, and therefore comes out each time brim full. It has handles 100 projecting from opposite sides, said handles terminating in eyes 101. Said eyes are straddled by the bifurcated ends 102 of supporting rods 103, which extend upward and outward, terminating in sockets 104, which surround the racks 74 and are adjustably secured thereto. The bifurcated ends of the rods 103 and eyes 105 which are aligned with the eyes in the handles, and pins 106, pass through said aligned eyes, removably securing the pan 99 operatively to the racks 74.

The small pan 99 therefore goes up and down with the racks 74. When it goes down, it fills with chocolate from the larger pan 91. As it comes up, the basket of inverted hard frozen cones is approaching along the track 23. As the basket gets over the pan 99, the latter in the final part of its rising movement, submerges the mounds of ice cream protruding from the cones in the warm enrobing mixture. As the pan 99 recedes and the basket of enrobed cones moves forward toward the nut applying station, the low temperature of the ice cream starts to quickly solidify the coating, which is not quite solid when it reaches the nut applying station, but is past the dripping stage. Any drip which may occur as the basket moves from over the pan 99 is caught on a fixedly supported inclined baffle 107, which overhangs the larger pan 91 and drains back to the larger pan. The pan 99 has a normally closed drain spout 108.

Referring for the moment particularly to Figure 1, it will be understood that since the racks 74 commonly operate rack bar 47 and the enrobing pan 99, it follows that when said pan begins to descend, the basket starts to move forward toward the nut applying station, the pan having reached a point below the level of the cones when the first row of cones moves beyond the front end of the pan. The congellation of the chocolate coating has already progressed, so that there is but little drip in the region of the baffle 107, and by the time the basket reaches the nut applying station there is no drip, but the enrobed surface of the cone is sufficiently tacky to cause the nut fragments to adhere.

The nut applying station is located between the transverse frame members 38 and 39, and their extensions 42 and 43. A flat transverse bar 109, Figures 1, 4, 5 and 11, is welded between the lower longitudinals 28, and at its middle carries the bushing 110. A similar bushing 111 is above the bushing 110, and in vertical alignment therewith, being supported by a bar 112 welded to the cross pieces 113 and 114 which extend between the upper longitudinals 27.

A vertical catapult 115 is supported by said bushings. It comprises a reciprocable stem 116 guided within said bushings, having a head which embodies a diaphragm 117.

A subframe 118 is built about the upper portion of the stem of the catapult and supports the peripheral edge of the diaphragm in a common horizontal plane. Said subframe is constructed of members of angle cross-section, comprising the legs 119 which are in vertical transverse planes but flare longitudinally, as shown in Figure 5. The lower ends of said legs are welded to the upper longitudinals 27. The legs support a rectangular surround 120 of angular cross-section, the vertical flanges of which is welded to the legs, and the upper flange of which extends horizontal. All four sides of the subframe are enclosed within a sheet metal jacket 121, the top edge 122 of which is flanged over the upper flange of the surround in the manner shown in Figure 5, and constitutes the surface which directly contacts the peripheral margin of the diaphragm. On top of the diaphragm is a rectangular washer-like surround 123, the sides of which are flat, as shown at 124 in Figure 5, while the ends, that is, the transverse terminal portions, are bent upwardly to form short flanges 125, as seen in Figure 4. A tunnel-like casing 126 is provided, that is, it has closed top and side walls, but is open at both ends, as shown at 127 in Figure 4. The side walls have outwardly turned flanges 128, which rest upon the flat portions 124 of the surround 123. Bolts pass through the superposed flanges of the members 120, 121, the diaphragm, the flanges 124 of the surround 123, and the flanges 128 of the jacket 126, clamping the peripheral margin of the diaphragm.

Referring now to the means for reciprocating the diaphragm, the motor 34, Figures 1, 4, 5 and 11, through gearing represented by the numeral 129, operates a cam 130 mounted on the outer end of a shaft 131, journaled in bearings 132 mounted on a base 133 which bridges the cross pieces 32 and is welded or otherwise suitably secured thereto. The cam operates against a roller 134, mounted on a pin 135 between the spaced sides 136 of a swinging arm 137, which is hingedly carried by a pintle 138, which Figure 11 indicates is welded to the adjacent cross piece 32. At the outer end of the swinging arm 137 a vertical arm 139 is pivoted at 140. Said vertical arm also consists of spaced sides 141, as shown in Figures 4 and 12, the upper ends of said sides being pivotally connected to trunnions 142 projecting from a cross head 143, which is bushed as at 144 in Figure 11, and surrounds the stem 116 of the catapult, but is fixed to said stem by means such as the set screw 145.

Figure 9:
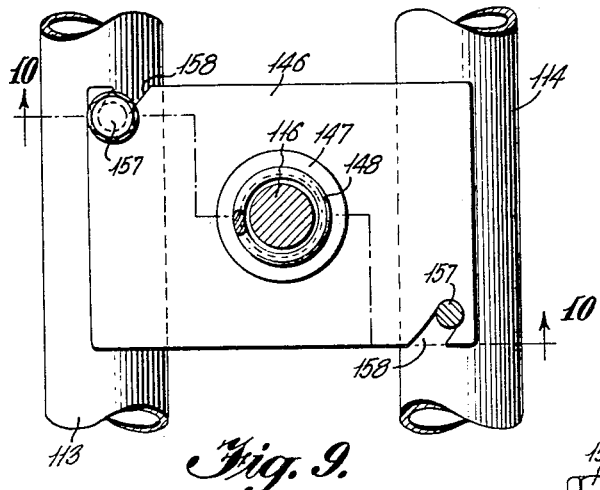
Figure 9 is a section taken along the line 9—9 of Figure 4.
Figure 10:
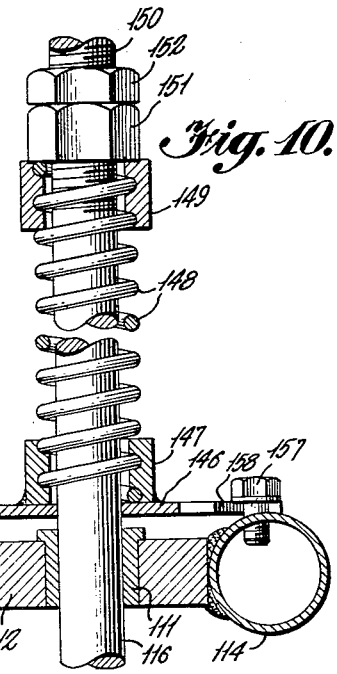
Figure 10 is a vertical section taken along the line 10—10 of Figure 9.
Figure 11:
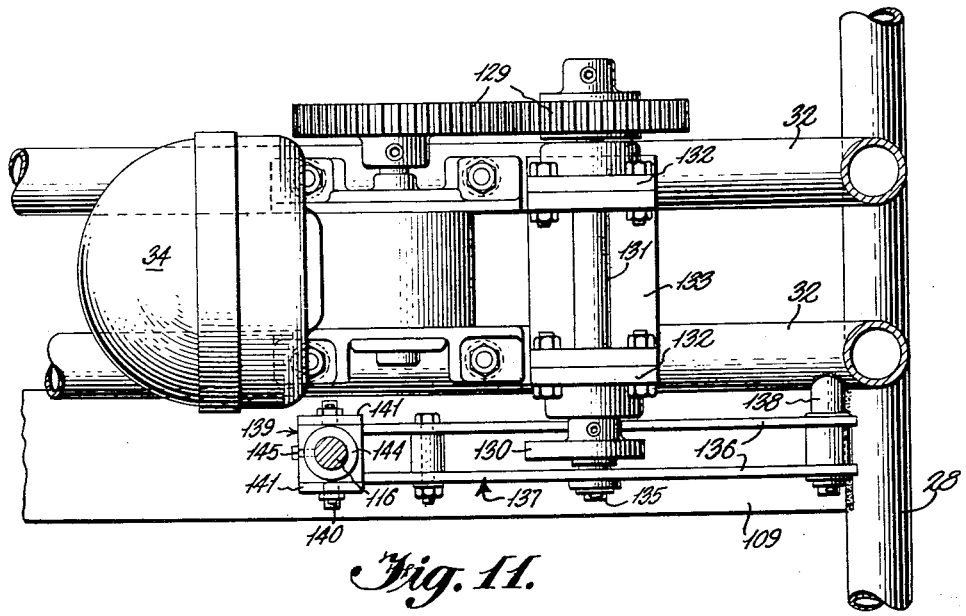
Figure 11 is a section taken along the line 11—11 of Figure 5.

A spring unit surrounds the stem 116 of the catapult, being shown in detail in Figure 10, consisting of a platform 146 (see also Figure 9), having a boss 147 fixed to its upper side, said boss constituting the seat for the lower end of a rather power helical spring 148 which surrounds the stem. The upper end of the spring is seated in a thrust washer 149. In the embodiment shown, the bushing and thrust washer are formed with interior helical grooves in which the respective ends of the spring are threaded, so that the spring and the platform at the bottom and thrust washer at the top are a unitary structure. The stem 116 has a threaded zone 150 on which an adjusting nut 151 and a lock nut 152 are screwed. Above the threaded zone the stem has a reduced portion 153 which terminates in a threaded end 154, on which the nuts 155 are screwed, which retains between them the U-shaped lug 156 which forms a connection between the stem of the catapult and the diaphragm, as will appear. The platform 146 is bolted at opposite corners to the cross pieces 113 and 114 by the stud bolts 157. As a matter of convenience in disassembling, the stud bolts pass through open ended slots 158 in the platform, so that the latter can be partially rotated after the stud bolts 157 have been loosened, thereby detaching the spring unit from the frame.

The function of the catapult is that of a vibrator to dash nut fragments or other granular material against the tacky surfaces of the enrobed cones. The upper face of the diaphragm acts as a table upon which the nut fragments rest, and from which they are thrown into the air to a height sufficiently to contact the surface of the enrobing coating. The vibration must be in the nature of repeated impact blows. This is accomplished through the action of the cam 130 correlated with that of the spring 148. The cam is rotated in the direction of the arrow. It has quite a long throw represented by the difference between the line $a$ and the line $b$. The swinging arm 137 is depressed by the cam to the lowest point represented in Figure 5, drawing down the stem 116 of the catapult against the tension of the spring 148. After this point the height of the cam falls off quite abruptly so that the spring 148 when released expands with considerable suddenness, forcing the diaphragm upward, causing the nut fragments to be projected into the air. It is desirable to have the surfaces of all of the cones uniformly coated, and it is also highly desirable that the nut fragments shall not fly out at the open ends of the tunnel constituted by the casing 126. Consequently, the diaphragm 117 is given a predetermined shape, which by trial and error has been found to give the optimum direction of trajectory of the vibrated particles. The lug 156 is a rigid part of an elongated horizontal support 159, having down turned side flanges 160 and rounded down turned ends 161, the former being in the interest of rigidity and the latter presenting a rounded surface in contact with the diaphragm when the latter is vibrated upwardly to minimize wear of the diaphragm. The support 159 is in contact with a plate 162, formed with a dihedral angle along its longitudinal center, said plate being longer than wide, so as to come closer to the closed sides of the casing 27 than to the open ends thereof, the comparison being readily made by reference to Figures 4 and 5. A conformer 163 is provided in the form of a stiff rod or wire, which lies in the dihedral apex of the plate 162, the diaphragm intervening. The conformer 163 has threaded shanks 164 welded thereto, and which project through aligned holes in the plate 162 and support 159. Nuts on said shank press the conformer against the diaphragm, and cause the latter to conform to the dihedral shape of the plate 162, thus forming a dihedral depression in the diaphragm which comes close to the closed sides and less close to the open sides of the casing 126.

Nut fragments or other granular material may be supplied to the catapult through the door 165 at the top of the casing 126. Since the conveyor bar 60 intersects the opening closed by said door, an inverted trough-shaped guard 166 bridges said opening, overlying the path of movement of the conveyor bar and being secured to said casing. Nut fragments from the sloping portions of the diaphragm which constitute the dihedral depression will be thrown in inclined trajectories in opposite directions. Nut fragments on the marginal portions surrounding the dihedral depression will be thrown more nearly vertically, and since these outlying portions of the diaphragm are wider adjacent the open ends of the casing 126, the tendency of the nut fragments to be thrown out at the ends of the tunnel is minimized. Furthermore, when the basket with its complement of ice cream cones is within the casing 126, the open ends of the casing are for the most part occluded by the presence of the cones. The upturned ends 167 of the conformer 163 prevent wearing contact of the ends of the conformer with the diaphragm.

It is a peculiarity of most nut meats or fragments of the same that if they are constantly beaten or jarred they sweat oil, and if the surface is oily the adherence of the nut fragments to the chocolate coating is impaired. Consequently, it will not do for the catapult 115 to work continuously, but only intermittently, and for such short periods as are essential to effect the proper density of distribution of nut fragments upon the coated surface of the cones. Therefore, a timer switch 168 is provided, suitably supported within the tunnel of the casing 126, the details of which are not shown, being conventional, said timer including an actuating arm 169 at the end of a shaft 170, which extends within the timer and is part of the mechanism of the same. Said actuating arm extends over the track 23 in position to be struck by the front corner of the basket. Since the basket is moving into position at the nut applying station when this engagement takes place, the arm 169 will be swung laterally, starting the timer by the time the basket is in place at said station. The motor circuit is closed simultaneously with the starting of the timer, and the period during which the nuts are applied is determined by the interval for which the timer is set. This interval generally continues until the basket has begun to travel toward the bagging station so that the actuating arm 169 will still be in deflected position when the rear corner of the basket passes it, and will not be affected by the passing of said rear corner.

The set screw 145 which secures the operating means to the stem 116 of the catapult constitutes an adjustment which determines the amplitude of the reciprocation of the catapult, and therefore determines the force as well as the height to which the nut fragments will be thrown by said catapult.

The upward movement of the catapult is not restrained by the cam 130. When the roller 134 falls abruptly from the long axis of the nose of the cam, the spring 148 which is unitary with the platform 146 and with the front washer 149, is free to suddenly expand to its full repose length and a little more, due to its inertia, this being the measure of the upward movement of the diaphragm. The force of the spring is transmitted through the adjusting nut 151 with which the thrust washer 149 is already in contact, so that the push is a little less than a true impact blow. The nut 151 adjusts the compression of the spring 148, and auxiliary or alternative to the adjustable cross head 143, it is a means for determining the limit of upward movement of the diaphragm.

While I have in the above invention disclosed what I believe to be a preferred and practical embodiment of the inventive concept, it will be understood by those skilled in the art that the specific construction and arrangement of parts, as shown, are by way of example and not to be construed as limiting the scope of the invention.

What I claim is:

1. Confection coating apparatus for applying successive coatings of edible material to a frozen confection which protrudes beyond the cone, the protruding part being enrobed with a coating and having edible granules dispersed thereupon and adhering thereto, said apparatus comprising a frame, a track extending through said frame, a basket slidable on said track, said basket being of the known type that suspends inverted ice cream cones in a plurality of transverse rows by releasable impaling means individual to the rows, means supported by said frame and sequentially arranged to define an enrobing station and a granule applying station, conveyor means for moving said basket first to a position at said enrobing station and then to a position at said granule applying station, said conveyor means comprising a rack bar in a plane above said track and parallel thereto, hangers in which said rack bar is slidably guided, a series of individual pawls depending from said rack bar, said pawls being adapted to ride over an end of said basket upon retrograde movement of said rack bar and to successively engage an end of said basket upon successive advance movements of said rack bar, a supply pan for enrobing liquid at said enrobing station, a smaller enrobing pan above said supply pan and beneath a basket of inverted cones when it is at said enrobing station, means for vertically reciprocating said enrobing pan through a range which on the one hand submerges it beneath the liquid level in said supply pan so that it emerges brim full, and which on the other hand submerges the protruding fillings of said inverted cones in the enrobing liquid in said enrobing pan, the means which reciprocates said enrobing pan being operatively connected to said rack bar to operate the latter in such phase of synchronization that the basket is moved to the enrobing station as the enrobing pan rises and away from said enrobing station as the enrobing pan descends.

2. Confection coating apparatus for applying successive coatings of edible material to a frozen confection which consists of an ice cream cone filled with hard frozen mix which protrudes beyond the cone, the protruding part being enrobed with a coating having edible granules dispersed thereupon and adhering thereto, said apparatus comprising a frame, a track extending lengthwise through said frame and supported thereby, a basket slidable on said track, said basket being of the known type that suspends inverted ice cream cones in a plurality of transverse rows by releasable impaling means individual to the rows, means supported by said frame and sequentially arranged to define an enrobing station and a granule applying station, conveyor means for moving said basket first to a position at said enrobing station then to a position at said granule applying station, said conveyor means comprising a rack bar in a plane above said track and parallel thereto, hangers in which said rack bar is slidably guided, a series of unidirectional pawls depending from said rack bar, said pawls being adapted to ride over an end of said basket upon retrograde movement of said rack bar and to successively engage an end of said basket upon successive advance movements of said rack bar, a shaft extending across said frame journaled in bearings in said frame and having gears at its ends, and a gear at an intermediate point meshing with the teeth of said rack bar, a motor, a crank driven by said motor including a crank pin, a cross head vertically reciprocable in a transverse plane having a transverse slot in which said crank pin plays, toothed racks extending vertically from the ends of said cross head, guides on said frame through which said racks reciprocably slide, said racks being in mesh with the gears on the ends of said shaft, a supply pan for enrobing liquid at said enrobing station, a smaller enrobing pan above said supply pan and beneath a basket of inverted cones when said basket is at said enrobing station, means for connecting said enrobing pan to said toothed racks for reciprocating said enrobing pan, said supply pan, basket and enrobing pan being at such distances apart that the range of movement imparted to said enrobing pan by said toothed racks, on the one hand submerges said enrobing pan beneath the liquid level in said supply pan so that it emerges brim full, and on the other hand, submerges the protruding fillings of the inverted cones in the enrobing liquid in said enrobing pan, the movements of said rack bar and said enrobing pan being so synchronized that the basket is moved to said enrobing station as the enrobing pan rises and is moved away from said enrobing station as said enrobing pan descends.

3. Confection coating apparatus for applying successive coatings of edible material to a frozen confection which consists of an ice cream cone filled with frozen mix which protrudes beyond the cone, the protruding part being enrobed with a coating and having edible granules dispersed thereupon and adhering thereto, said apparatus comprising a frame, a track extending longitudinally through said frame supported thereby, a basket slidable on said track, said basket being of the known type which suspends inverted hard frozen filled ice cream cones in a plurality of transverse rows through the instrumentality of releasable impaling means individual to the rows, means supported by said frame and sequentially arranged, to define an enrobing station, and a granule applying station, conveyor means for advancing a basket along said track from a position at said enrobing station to a position at said granule applying station, a supply pan at said enrobing station for enrobing liquid, a smaller enrobing pan between said supply pan and track, means for reciprocating said enrobing pan through a range of movement that submerges it below the liquid level in said supply pan on the down stroke so that it comes out brim full, and submerges the protruding fillings of the inverted cones in said basket in the liquid in said enrobing pan on the up stroke, a drip baffle at the side of said supply pan adjacent said granule applying station, inclined toward said supply pan to drain liquid back thereto, a casing forming a tunnel at said granule applying station through which said track extends, a vertically reciprocable catapult beneath said track comprising a diaphragm for supporting edible granules, a vertically guided stem secured to the under side of said diaphragm, spring means for urging said diaphragm upwardly, a motor, a cam driven by said motor operatively connected to said stem for alternately and repeatedly compressing and releasing the spring means, whereby granules are dashed upon the enrobed coatings of the inverted cones when the basket is at said granule applying station.

4. Confection coating apparatus for applying successive coatings of edible material to a frozen confection of the type consisting of an ice cream cone filled with hard frozen mix which protrudes beyond the cone, the protruding part being enrobed with a coating having edible granules dispersed thereupon and adhering thereto, said apparatus including a frame, and in juxtaposition upon said frame, means for enrobing the protruding fillings of such cones and means for applying edible granules to said enrobed fillings, a track extending through said frame over said enrobing means and granule applying means, a basket slidable on said track, said basket being of the cone type which suspends the filled cones in inverted position in rows from its bottom, means for moving a basket of cones from a position above said enrobing means to a position over said granule applying means, stopping it in each position to effect the enrobing and granule application, said granule applying means including frame members beneath said track defining a surround in a horizontal plane bounding an area at least as large as said basket, a flexible diaphragm overlying said surround having its peripheral edge secured to said surround, the upper face of said diaphragm being a receptor for granules, a stem secured to the under side of said diaphragm for flexing it, guides in which said stem is vertically reciprocable, a spring surrounding said stem and upwardly bearing against an abutment on said stem to resiliently bias said diaphragm upwardly, a motor, a cam rotated by said motor, said cam having a long throw followed by an abrupt descent, an arm pivoted to said frame at one end and at the other connected to said stem, said arm having means engaged by said cam for oscillating said arm to alternately compress and release said spring for dashing granules against the enrobed surface of said cones through the release pressure of said spring.

5. Apparatus for applying edible granules to the enrobed surfaces of confections, comprising in combination with a carrier which presents the tacky enrobed surfaces of confections in a downward direction, an upwardly facing diaphragm beneath said enrobed surfaces, spaced therefrom, and adapted to support nut fragments or the like on said diaphragm, vertically reciprocable supporting means for said diaphragm, a spring beneath said diaphragm bearing against said supporting means and resiliently biasing said supporting means and diaphragm upwardly to rapidly lift said diaphragm vertically when said spring is released from a compressed condition and cause said diaphragm to throw said nut fragments against said enrobed surfaces, and means for repetitively compressing and releasing said spring.

6. Apparatus for applying edible granules to the enrobed surfaces of confections comprising in combination with a track, a carrier presenting the tacky enrobed surfaces of confections in a downward direction, slidable on said track to a nut applying station, means forming an open ended tunnel overlying said track at said station, an upwardly facing diaphragm beneath said enrobed surfaces, spaced therefrom, adapted to support nut fragments or the like on the upwardly facing surface thereof, vertically reciprocable supporting means for said diaphragm, a spring beneath said diaphragm bearing against said supporting means and resiliently biasing said supporting means and diaphragm upwardly to rapidly lift said diaphragm vertically when said spring is released from a compressed condition and cause said diaphragm to throw said nut fragments against said enrobed surfaces, and means for repetitively compressing and releasing said spring.

7. Apparatus for applying edible granules to the enrobing surfaces of confections, as claimed in claim 6, said apparatus including a motor for operating said spring compressing means and a timer switch for controlling the motor circuit, normally keeping it open, said timer switch having an actuating arm in the path of said carrier to be contacted thereby as the carrier reaches said nut applying station to close the motor circuit, said timer determining definite periods of vibration of said diaphragm.

8. Apparatus for applying edible granules to the enrobed surfaces of confections comprising in combination with a carrier presenting the tacky enrobed surfaces of confections in a downward direction, an upward facing diaphragm beneath said enrobed surfaces, spaced therefrom, having its peripheral margin fixed in a common plane and having a central downwardly deflected portion of fixed shape, having a wide V-shaped cross-section, and having a free flexible portion extending about said diaphragm between said central portion and the peripheral margin, the upper face of said diaphragm being adapted to hold nut fragments or the like, the shape of said diaphragm confining the trajectories of said nut fragments substantially to the area occupied by said enrobed surfaces and controlling the uniform distribution of said nut fragments, and means intercoupled with the underside of said diaphragm for actuating said diaphragm periodically in a manner to cause said diaphragm to throw nut fragments thereon against said enrobed surface.

9. In apparatus for applying edible granules to the enrobing surfaces of confections as claimed in claim 8, said diaphragm actuating means including a dihedral plate contacting the underside of the central portion of the diaphragm for determining its shape, and a rod-like conformer on the upper face of said diaphragm registering with the apex of said dihedral plate and secured to said plate through said diaphragm, for fixing the shape of said central portion, the thrust of said means for actuating the diaphragm being transmitted to said dihedral plate.

10. In apparatus for applying edible granules to the enrobed surfaces of confections, in combination with a carrier which holds the confections with the tacky enrobed surfaces in a downward direction, a frame beneath said carrier defining a surround in a horizontal plane bounding an area at least as large as that which embraces said enrobed surfaces, a flexible diaphragm overlying said surround having its peripheral margin fixed with respect to said surround, means for maintaining a rigid central depression in the upper face of said diaphragm, that portion of said diaphragm between said depression and margin being flexible, the upper face of said diaphragm being a receptor for nut granules, a stem secured to the underside of said diaphragm for vibrating it, guides in which said stem is vertically reciprocable, a spring unit including a spring, a platform to which the bottom of said spring is attached, and a thrust washer attached to the top of said spring, said stem passing through said spring and through apertures in said platform and washer and having abutment means bearing downwardly upon said washer, said spring unit being frame supported with said washer thrusting against said abutment on said stem, a motor, a cam rotated by said motor, said cam having a low throw followed by an abrupt descent, an arm pivoted to said frame at one end and at the other connected to said stem, said arm having means engaged by said cam for oscillating said arm and thereby reciprocating said stem to cause said abutment to alternately compress and release said spring whereby said spring imparts a sudden upward jerk to said diaphragm when released for dashing granules against the enrobed surface of said cones through the release pressure of said spring.

References Cited in the file of this patent

UNITED STATES PATENTS

| | | |
|---|---|---|
| 2,187,617 | Fogg | Jan. 16, 1940 |
| 2,266,635 | Hagerty | Dec. 16, 1941 |
| 2,666,410 | Bundy | Jan. 19, 1954 |
| 2,670,887 | Landgraber | Mar. 2, 1954 |